M. SEGEL.
INTERMITTENT MECHANICAL MOVEMENT.
APPLICATION FILED JUNE 13, 1913.

1,212,570.

Patented Jan. 16, 1917.
2 SHEETS—SHEET 1.

WITNESSES:
Mabel Duttenhoefer
Robert Richter

INVENTOR
Michael Segel.
BY
G. Warren Wright
ATTORNEY

M. SEGEL.
INTERMITTENT MECHANICAL MOVEMENT.
APPLICATION FILED JUNE 13, 1913.

1,212,570.

Patented Jan. 16, 1917.
2 SHEETS—SHEET 2.

WITNESSES:
Mabel Dittenhoefer
Robert Richter

INVENTOR
Michael Segel.
BY
Warren Wright
ATTORNEY

UNITED STATES PATENT OFFICE.

MICHAEL SEGEL, OF NEW YORK, N. Y.

INTERMITTENT MECHANICAL MOVEMENT.

1,212,570. Specification of Letters Patent. Patented Jan. 16, 1917.

Application filed June 13, 1913. Serial No. 773,382.

*To all whom it may concern:*

Be it known that I, MICHAEL SEGEL, a citizen of the United States, residing at New York city, in the county and State of New York, have invented certain new and useful Improvements in Intermittent Mechanical Movements, of which the following is a clear, full, and exact description.

The object of this invention is to provide improved mechanism to provide intermittent movement of a moving picture film, whereby a more stable movement of the film may be secured in a positive manner.

In carrying out my invention, I provide on the continuously operating shaft a fly wheel, through the face of which protrudes a rod which is pivotally and slidably secured to the casing surrounding the fly wheel on the one hand, and is at times caused to engage a Geneva wheel, so that the rod will act as a crank when engaging the wheel to turn the wheel the given distance permissible; and then the crank becomes disconnected from the Geneva wheel until a complete revolution of the fly wheel has again brought the crank into position for another operation of the fly wheel. The usual cylindrically notched Geneva engagement wheel is provided to keep the intermittently operating shaft stationary at all times, except when engaged by the temporary crank mechanism.

The scope of my invention will be pointed out in the claims.

Figure 1:
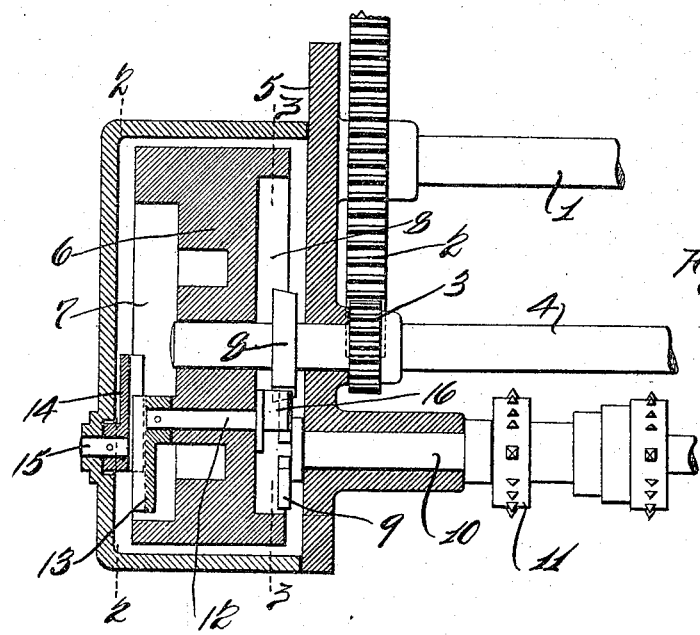
Figure 2:
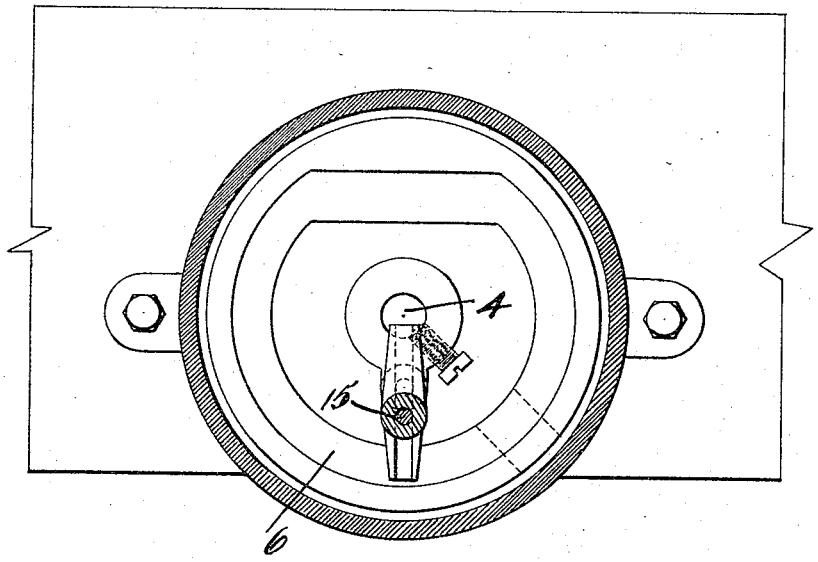
Figure 4:
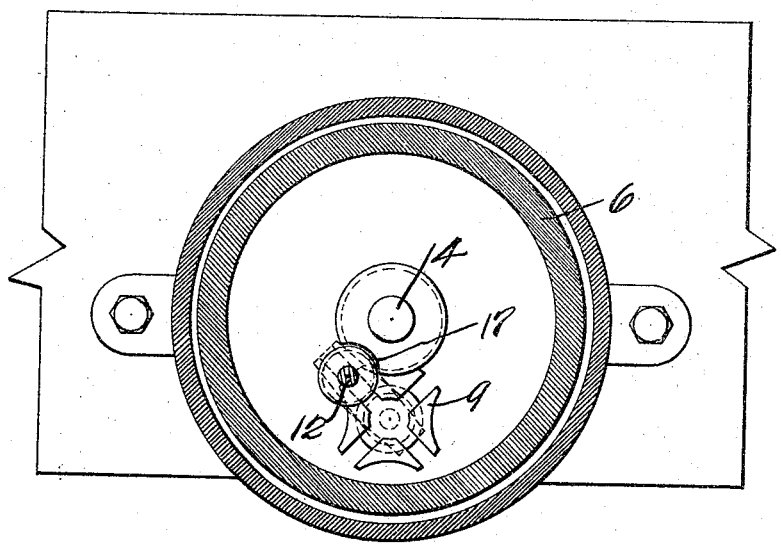
Figure 5:
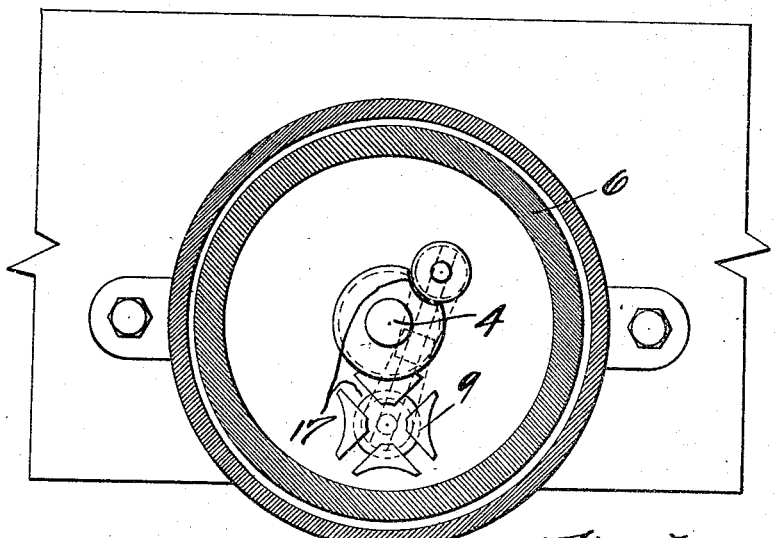
Figure 6:

In the accompanying drawings: Figure 1 is a sectional elevation of my improved mechanism. Fig. 2 is a section through the casing on line 2—2 Fig. 1. Fig. 3 and Fig. 4 are both sections through the line 3—3 Fig. 1, one showing the Geneva wheel, and the cylindrical engaging member just as the two are to turn after engagement with the crank; the other while both are locked in position. Fig. 5 is a perspective view of the engaging slide on the Geneva wheel side of the fly wheel.

As shown in the drawings, 1 is an ordinary power shaft provided with a gear 2 meshing with a gear 3 on a continuously rotating shaft 4, rotating in the frame 5. The shaft 4 carries the fly wheel 6 at one end, and is recessed at 7, and at 8, as shown in Fig. 1. The shaft carries between the frame 5 and the fly wheel 6, the notched cylindrical Geneva wheel engagement member 8, which normally engages the Geneva wheel 9 as shown in Fig. 4, being fastened on the shaft 10, on which the intermittent sprockets 11 are secured. The fly wheel 6 is bored at a distance from its axle, and a freely rotatable shaft 12 inserted. The shaft is pinned to a slide 13 on one side of the fly wheel, which engages a slotted guide 14, which is freely pivoted on a shaft 15, while on the other side of the fly wheel, the device shown in Fig. 5, which has an engaging ridge 16 adapted at times to enter the slots of the Geneva wheel is fastened, as shown in Fig. 1.

In operation, the shaft 4 with fly wheel 6 and notched cylindrical member 8 are continuously rotated. In fly wheel 6 is mounted the shaft 12, which is at one end of ridge 16. This shaft 12 and ridge 16 is carried around the axis 4 in the fly wheel 6, and only partially revolved around its own axis, as the ridge 16 must always be in direct alinement with a slot of the intermittent shaft 10. I therefore provide a pivotally mounted frame 14 mounted on pivot 15. Pivot 15 is mounted in the frame 2. This pivotally mounted member 14 engages a member 13, which is mounted on shaft 12 for the purpose of guiding and keeping the ridge 16 at all times in alinement with the center of the intermittent shaft 10, during rotation of the fly wheel 6 and especially at the time when said member 16 is about to enter the intermittent member 9. The guides 14, 15 and 13, and the ridge 16 and shaft 12 in combination with other elements constitute the main features of my invention. The ridge 16 will follow down toward the center of the Geneva wheel, and as the crank is turned contraclockwise in Fig. 3, the Geneva wheel will immediately be rotated by the crank action of the ridge 16, the member 8 following the rotation of the shaft 10, and again locking the device in the position of Fig. 4, the ridge 16 sliding out to the left as shown in Fig. 4, and continuing its motion around its circle.

I claim as my invention:

1. The herein described intermittent mechanical movement consisting of a continuously rotating shaft and an intermittently rotatable shaft, grooves on the intermittent shaft, a mechanism carried by the continuously rotating shaft, consisting of a member having a ridge, said ridge being shaped to fit the grooves in the intermittent shaft, and said ridge being carried and slid into a groove of the intermittent shaft at intervals by the rotation of the continuously rotating shaft.

2. The herein described intermittent mechanical movement consisting of a continuously operating shaft, a wheel mounted thereon, an intermittent shaft, an oscillating member mounted on said wheel, and means to guide said oscillating member to engage the intermittent shaft, and means for normally locking the intermittent shaft when not engaged.

3. The herein described intermittent movement consisting of a continuously rotating shaft, a flywheel or disk thereon, an intermittent shaft, a grooved member carried by said intermittent shaft, a pivotally mounted tongue carried by said disk adapted to engage the intermittent member at intervals, and means for guiding said pivotally mounted member during its operation properly as described.

4. The herein described intermittent mechanical movement, consisting of an intermittently rotatable shaft and a continuously operatable shaft, a pivotally mounted member carried thereby, said member having at least one elongated ridge, said ridge engaging said intermittently operated shaft, a support frame for both shafts, and guide members carried by said frame and the ridge member to aline the ridge member with the engagement elements of the intermittent shaft and means to lock the intermittent shaft when not engaged by said ridge member.

Signed at New York city, New York, this 7th day of June, 1913.

MICHAEL SEGEL.

Witnesses:
WM. A. HAYES,
HENRY L. RUPERT.

Copies of this patent may be obtained for five cents each, by addressing the "Commissioner of Patents, Washington, D. C."